United States Patent [19]

Decroix et al.

[11] Patent Number: 5,590,393
[45] Date of Patent: Dec. 31, 1996

[54] NEUTRON-ABSORBING MATERIAL AND ITS PRODUCTION PROCESS

[75] Inventors: Guy M. Decroix, Chevilly-Larue; Dominique Gosset, Bourg-la-Reine; Bernard Kryger, Paris, all of France

[73] Assignee: Commissariat a l'Energie Atomique, Paris, France

[21] Appl. No.: 373,262

[22] PCT Filed: May 25, 1994

[86] PCT No.: PCT/FR94/00614

§ 371 Date: Feb. 7, 1995

§ 102(e) Date: Feb. 7, 1995

[87] PCT Pub. No.: WO94/28556

PCT Pub. Date: Dec. 8, 1994

[30] Foreign Application Priority Data

May 26, 1993 [FR] France .................................. 93 06304

[51] Int. Cl.⁶ ..................................................... B22F 3/12
[52] U.S. Cl. ........................... 428/552; 428/546; 428/551; 419/12; 419/14; 419/16; 419/32; 419/48; 419/49; 419/51
[58] Field of Search ................................. 428/546, 551, 428/552; 419/12, 14, 16, 32, 48, 49, 51

[56] References Cited

U.S. PATENT DOCUMENTS

| 3,565,762 | 2/1971 | Nickel | 176/86 |
| 3,976,735 | 8/1976 | Benton | 264/125 |
| 4,289,720 | 9/1981 | Yajima et al. | 264/63 |
| 4,826,630 | 5/1989 | Radford et al. | 252/478 |
| 5,156,804 | 10/1992 | Halverson et al. | 376/419 |
| 5,272,735 | 12/1993 | Bryan et al. | 376/261 |
| 5,273,709 | 12/1993 | Halverson et al. | 419/45 |

FOREIGN PATENT DOCUMENTS

| 0359683 | 3/1990 | European Pat. Off. . |
| 1564226 | 9/1969 | Germany . |

OTHER PUBLICATIONS

Chemical Abstracts, vol. 61, No. 11, 1964, AN 12890c, "Properties of Some High-Temperature Control Materials".

Primary Examiner—Donald P. Walsh
Assistant Examiner—John N. Greaves
Attorney, Agent, or Firm—Oblon, Spivak, McClelland, Maier & Neustadt, P.C.

[57] ABSTRACT

The invention relates to a neutron-absorbing material and to its production process.

This material comprises a homogeneous, boron carbide matrix 1 in which are dispersed e.g. pseudospherical, 150 to 500 μm, calibrated clusters 3 of boride such as $HfB_2$, in order to prevent the propagation of cracks F in the material and improve its thermal shock resistance.

9 Claims, 3 Drawing Sheets

NEUTRON-ABSORBING MATERIAL AND ITS PRODUCTION PROCESS

The present invention relates to a neutron-absorbing material and to its production process.

A material of this type can in particular be used in nuclear reactors such as pressurized water reactors and fast neutron reactors.

At present, the most widely used neutron-absorbing material in nuclear reactors is boron carbide, e.g. $B_4C$, because it is an inexpensive material, whose effectiveness can be modulated by acting both on the $^{10}B$ isotope content of the boron and on the density and which also has good chemical inertia properties and a highly refractory character. Generally, it is used in the form of cylindrical pellets stacked in metal sheaths in order to form the control rods of the reactors.

However, it suffers from the disadvantage of having a poor behaviour under irradiation due to poor thermomechanical properties (low thermal conductivity and fragile nature), which limit its life. Thus, the emission of heat due to neutron (n, alpha) captures is sufficient to induce its fracturing, because the very high thermal gradients (up to 1000° C./cm in a fast neutron nuclear reactor) resulting therefrom lead to stresses occurring which exceed the strength of the material. Moreover, the generation of large quantities of helium brings about a significant swelling of the material and a microscopic cracking, which can in the long term bring about a complete disintegration of the pellets.

Research has also been undertaken with a view to improving the behaviour under irradiation of boron carbide, whilst retaining the greatest possible neutron absorption efficiency.

The present invention is directed at a neutron-absorbing material based on boron carbide having such improved properties. The neutron-absorbing material according to the invention is a composite material comprising a homogeneous boron carbide matrix in which are homogeneously dispersed calibrated clusters of at least one boride chosen from among $HfB_2$, $TiB_2$ and $ZrB_2$.

Therefore this material is a composite material of the ceramic/ceramic type, in which the reinforcement is ensured by the calibrated clusters of the boride $HfB_2$, $TiB_2$ and/or $ZrB_2$. The reinforcement due to these calibrated clusters is obtained as a result of the existence of residual stress fields in the material, which lead to a deflection of the cracks in the vicinity of the smallest calibrated clusters and to high microcrack concentrations in the largest calibrated clusters, which prevent the free propagation of the cracks.

In order to obtain these results, it is consequently important for the calibrated clusters to have the appropriate dimensions. In general, they are pseudospherical clusters with dimensions in the range 100 to 500 µm. It is also advantageous that these clusters have a residual porosity forming microcracks.

In order to obtain these results, the material must contain a sufficient boride quantity, but said quantity must not be excessive so as not to harm the neutron absorption efficiency of said material, the density of absorbing nuclei being lower in diborides than in boron carbide.

In general, the material incorporates at the most 40 vol % in all of boride or borides chosen from among $HfB_2$, $TiB_2$ and $ZrB_2$, preferably 20 to 30 vol. % of boride or borides.

Among the borides which can be used, hafnium diboride $HfB_2$ is particularly interesting, because it has the following remarkable properties:

- it has an excellent neutron absorption efficiency, hafnium being more effective than boron in the epithermal neutron range,
- its efficiency can be modulated by acting on its $^{10}B$ content and its density,
- it has very few active daughter nuclei resulting from neutron capture,
- it is very refractory, because its melting point is 3300° C.,
- it has a good thermal conductivity (i.e. an electron conductor),
- it has a good thermal inertia,
- it is completely chemically compatible both with boron carbide and with carbon, which makes it possible to produce stable mixtures with the boron carbide and also use the same shaping processes as those used for the boron carbide, particularly sintering under a uniaxial load at high temperatures in a graphite matrix and
- it has a thermal expansion coefficient higher than that of boron carbide, which makes it possible to produce residual stresses in compression in the boron carbide matrix.

A composite material of the boron carbide-titanium diboride type was described by Nishiyama et al in Trans JSCM, vol. 11, No. 2, 1985, pp. 53–62, but in this case the sought objective was to improve the hardness of the boron carbide by the precipitation of fine $TiB_2$ particles, without the need to carry out sintering under load. Thus, said material has a different structure from that of the composite material according to the invention, in which the titanium diboride is in the form of 150 to 500 µm calibrated clusters with a view to improving the thermal shock resistance of the boron carbide.

The composite material according to the invention can be prepared by powder metallurgy from a boron carbide powder and calibrated boride clusters.

The invention also relates to a process for the preparation of this neutron-absorbing material consisting of homogeneously mixing a boron carbide powder with an average grain size below 5 µm with calibrated clusters of the boride or borides, followed by the densification of the mixture by sintering under pressure at a temperature and for a time sufficient to obtain a final density at least equal to 90% of the theoretical density.

The calibrated boride clusters can be prepared from a very fine boride powder e.g. having a grain size below 5 µm by subjecting the powder to baking under a vacuum or a neutral atmosphere, at a temperature exceeding 1000° C., followed by the grinding or crushing of the baked product and screening the crushed or ground product in such a way as to only retain the clusters having a desired size, e.g. 100 to 500 µm.

For the baking process, the temperature is chosen as a function of the initial grain size of the boride powder and in such a way that the subsequent grinding is easy.

For the boron carbide powder, it is possible to obtain a homogeneous powder by dispersing a boron carbide powder in a way which is as homogeneous as possible, e.g. by ultrasonic application in a slip and then by drying and screening the powder. In order to then mix said powder with the calibrated boride clusters, it is possible to use conventional mixing procedures.

It is then possible to densify the mixture as in the case of the boron carbide by hot uniaxial compression or hot isostatic compression, using in the first case a graphite matrix and in the second a refractory metal, e.g titanium envelope. The pressure used is e.g. in the range 20 to 200 MPa. The temperature and duration of the sintering are chosen so as to obtain the desired final density exceeding 90% of the theoretical density.

Generally, the sintering temperature is in the range 1800° to 2200° C. The sintering time is 15 min. to 1 h.

The invention is described in greater detail hereinafter relative to an illustrative and non-limitative example and with reference to the attached drawings, wherein show:

FIG. 1 a micrograph illustrating the structure of the absorbent material according to the invention.

FIG. 2 a micrograph illustrating the evolution of a thermally caused crack in the calibrated clusters of the material of FIG. 1.

FIG. 3 a micrograph illustrating the transmission mode of a crack in the material of FIG. 1.

FIG. 4 for comparison purposes the fracture mode of a $B_4C$ pellet according to the prior art.

FIG. 5 a graph showing the stress-deformation behaviour of a material according to the invention, pure $B_4C$ and $HfB_2$.

The following example illustrates the preparation of boron carbide $B_4C$ pellets reinforced by calibrated hafnium diboride $HfB_2$ clusters.

In order to produce the pellets, the starting product is a $B_4C$ powder with a grain size below 5 μm and containing, as a result of its preparation, clusters having a size up to 1 mm. This powder is ultrasonically dispersed in an ethanol slip, followed by drying and screening in order to disperse the clusters.

Preparation also takes place of calibrated $HfB_2$ clusters from a $HfB_2$ powder also having a grain size below 5 μm. This powder is introduced into a graphite mould and is baked in vacuo at a temperature of 1200° C. for 30 min. The baked powder is then ground and screened in order to retain the clusters with a grain size from 400 to 500 μm.

The boron carbide powder is then mixed with the calibrated $HfB_2$ clusters separated in this way, so that the $HfB_2$ quantity represents 20 vol. % of the mixture.

From the mixture preparation then takes place of pellets having a diameter of 17 mm and a height of 25 mm, the mixture being introduced into a graphite mould and the mixture undergoing uniaxial compression in a furnace at a temperature of 2100° C., under a pressure of 60 MPa and for 1 hour.

This gives a composite material pellet incorporating a boron carbide matrix reinforced by calibrated $HfB_2$ clusters with a density of 96%, i.e. 4.1 g/cm$^3$.

Figure 2:
FIG. 2 shows with a magnification of 100 part of the pellet of FIG. 1 incorporating microcracked, calibrated $HfB_2$ clusters 500 μm in order to demonstrate the evolution of a thermally caused crack in a cluster of this type.

In FIG. 2 it can be seen that the thermally caused crack F evolving in the boron carbide matrix 1 is dispersed when it meets the calibrated $HfB_2$ cluster 3, which is itself microcracked. Thus, there is a dispersion of the cracks, which prevents the fracturing of the pellet.

Figure 1:
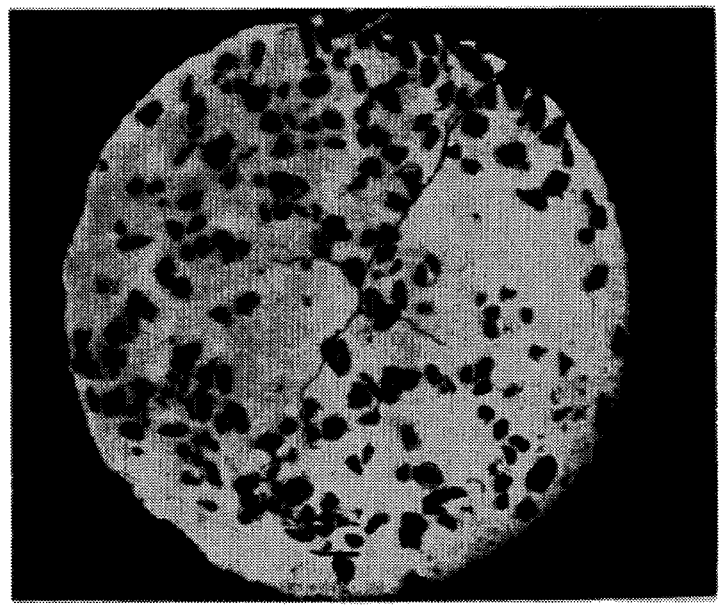
FIG. 1 is a micrograph obtained with a magnification of 5 of a 1 mm thick segment cut from the pellet when the latter undergoes a thermal shock under the following conditions: heat gradient approximately 500° C. between the core and periphery of the disk imposed in a cooling image furnace. It can be seen in FIG. 1 that cracks have developed in the pellet without leading to the fracture thereof.
Figure 3:
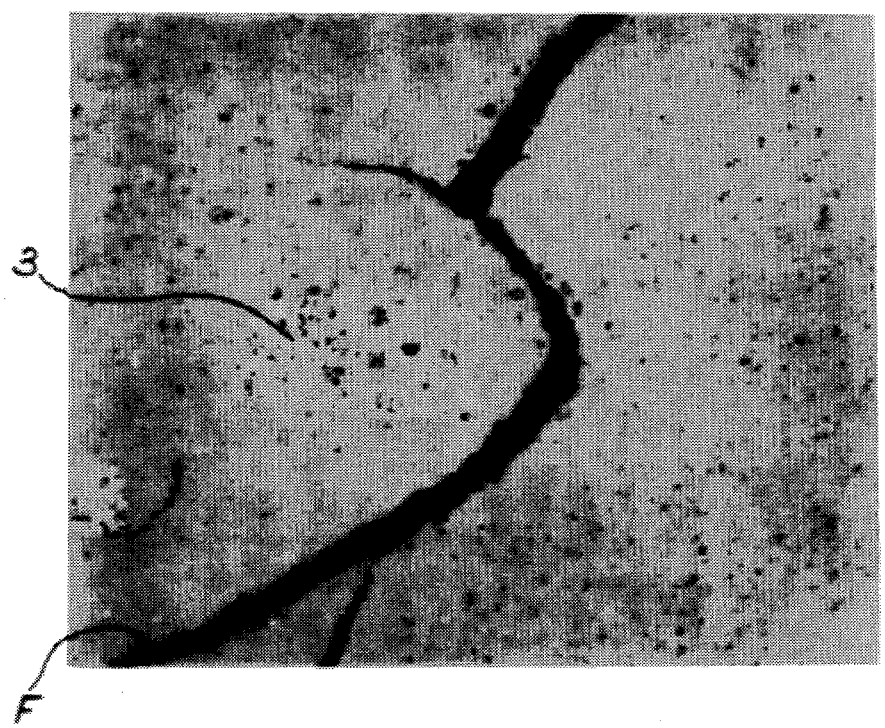

FIG. 3 shows another region of the pellet of FIG. 1 with a magnification of 200 to show how the presence of residual stresses around a 150 μm calibrated $HfB_2$ cluster 3 leads to a deflection of the crack F propagating in the material.

Figure 4:
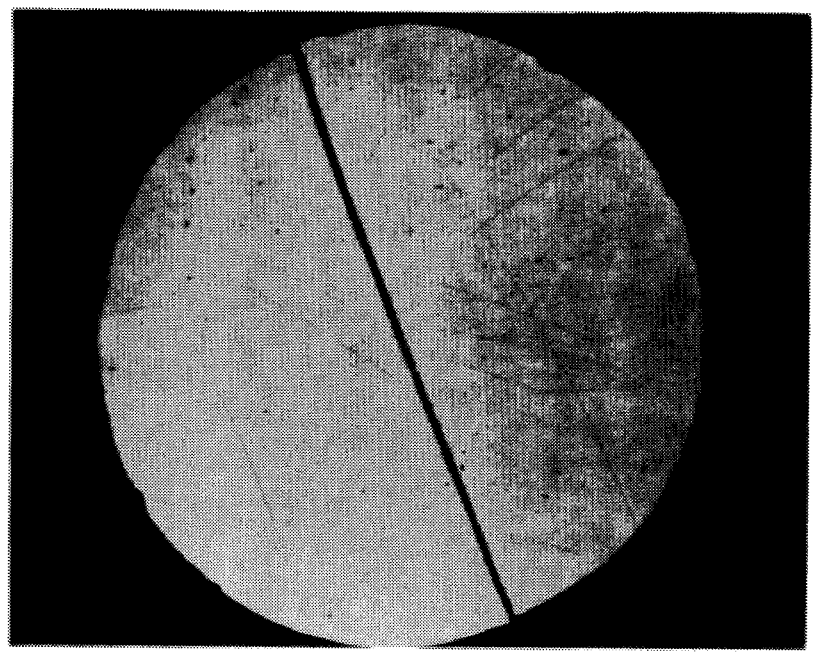

FIG. 4 shows, for comparison purposes, the development of a crack in a $B_4C$ pellet prepared under the same conditions, but without calibrated clusters, when it is subject to a thermal shock corresponding to half the power of the thermal shock used in FIG. 1. In FIG. 4 it can be seen that the crack causes the fracturing of the pellet.

Figure 5:
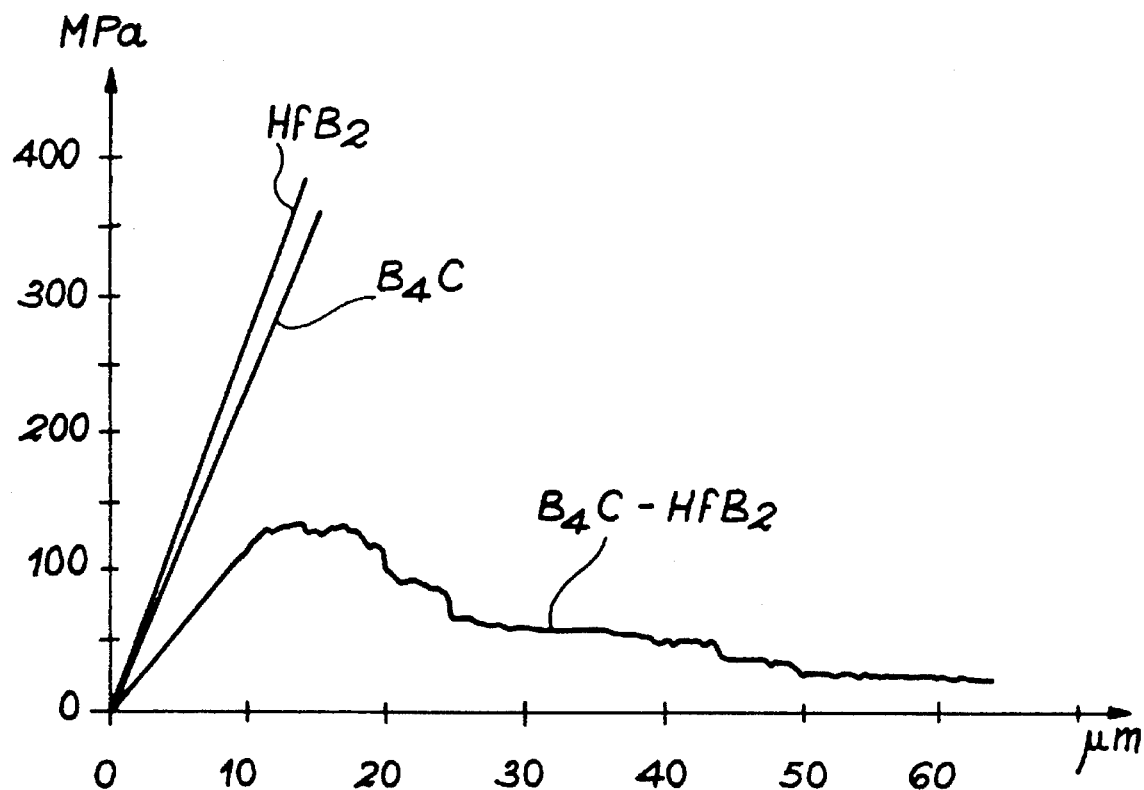

FIG. 5 shows the deformation behaviour of the composite $B_4C$-$HfB_2$ material containing 20% $HfB_2$ in the form of 400 μm calibrated clusters, namely the deformation in micrometers as a function of the stress applied in MPa. It is clear from FIG. 5 that the composite material according to the invention $B_4C$-$HfB_2$ has a fracture-free, pseudoplastic behaviour. However, the curves relating respectively to pure $B_4C$ and pure $HfB_2$ tested under the same conditions, illustrate the fragile behaviour of these materials.

Thus, the neutron-absorbing material according to the invention has a resistance to fracturing by thermal shock more than twice greater than that of a pure boron carbide with the same relative density. In the same way, the thermal diffusivity of the composite is well above that of the boron carbide.

Moreover, the mechanical properties of the neutron-absorbing material according to the invention are better than those of boron carbide. Thus, its apparent modulus of elasticity is approximately twice lower. It has a deformation of the pseudoplastic type and an elongation at break virtually three times that of pure boron carbide.

We claim:

1. A composite, neutron-absorbing material comprising a homogeneous, boron carbide matrix, in which are homogeneously dispersed calibrated clusters of at least one boride chosen from among $HfB_2$, $TiB_2$ and $ZrB_2$, wherein the calibrated clusters have dimensions of 100 to 500 μm.

2. The material according to claim 1, wherein the material contains at the most 40 vol. % in all of the boride or borides $HfR_2$, $TiB_2$ and/or $ZrB_2$.

3. The material according to claim 1, wherein the calibrated clusters are solely constituted by $HfB_2$.

4. A process for the preparation of a composite material according to claim 1, comprising homogeneous mixing of a boron carbide powder having an average grain size below 5 μm with calibrated clusters of the boride or borides and then densifying the mixture by sintering under pressure and at a temperature and for a time sufficient for obtaining a final density higher than 90% of the theoretical density.

5. Process according to claim 4, wherein the calibrated boride clusters are prepared from a boride powder having a grain size below 5 μm by baking under vacuum or a neutral atmosphere of the powder, followed by grinding and screening in order to separate the boride clusters of 100 to 500 μm.

6. Process according to claim 4, wherein sintering takes place by hot untaxial compression.

7. Process according to claim 4, wherein sintering takes place by hot isostatic compression.

8. Process according to claim 4, wherein the sintering pressure is 20 to 200 MPa.

9. Process according to claim 4, wherein the sintering temperature is 1800° to 2200° C. and the sintering time is 15 min. to 1 h.

* * * * *